(12) United States Patent
Nugraha

(10) Patent No.: US 11,385,736 B2
(45) Date of Patent: Jul. 12, 2022

(54) CONTROL ELEMENT, SYSTEM, USE AND METHOD

(71) Applicant: MOTHERSON INNOVATIONS COMPANY LIMITED, London (GB)

(72) Inventor: Thomas Agung Nugraha, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 15 days.

(21) Appl. No.: 16/672,914

(22) Filed: Nov. 4, 2019

(65) Prior Publication Data

US 2020/0142529 A1    May 7, 2020

(30) Foreign Application Priority Data

Nov. 5, 2018   (DE) .................... 10 2018 127 494.7

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
None
See application file for complete search history.

(56) References Cited

U.S. PATENT DOCUMENTS

| 2008/0238879 | A1 | 10/2008 | Jaeger et al. |
| 2013/0249808 | A1 | 9/2013 | Silk et al. |
| 2015/0070319 | A1* | 3/2015 | Pryor ...................... G06F 3/011 345/175 |
| 2015/0169080 | A1 | 6/2015 | Choi et al. |

FOREIGN PATENT DOCUMENTS

DE    102011084812 A1    4/2013

OTHER PUBLICATIONS

German Office Action dated Sep. 19, 2019 of German application No. DE 10 2018 127 494.7.

\* cited by examiner

*Primary Examiner* — Brian M Butcher
(74) *Attorney, Agent, or Firm* — Jones Day

(57) ABSTRACT

A control element is used for a display unit, a system includes a control element and a display unit, a method of using the control element and a method for operating a display unit in conjunction with the control element are described.

24 Claims, 10 Drawing Sheets

On car status:
Basic car

Temperature — Seat Heater/Fan
Airflow — Drive Mode
Air Direction — Information

On Nav. window:
Navigation

Zoom — Destinations
Alternative Rt — Map Mode
Route Status — Information

On playing movie:
Multimedia

Volume — Library
Time — Input Source
Radio — Information

CONTROL ELEMENT, SYSTEM, USE AND METHOD

CROSS-REFERENCE TO RELATED APPLICATIONS

This application claims the benefit of foreign priority to German Patent Application No. DE 10 2018 127 494.7, filed Nov. 5, 2018, which is hereby incorporated by reference in its entirety for all purposes.

BACKGROUND

1. Field of the Invention

The present disclosure relates to a control element for a display unit, a system including such a control element and a display unit, a use of such a control element and a method for operating a display unit in conjunction with such a control element.

2. Related Art

Displays in vehicles and especially in dashboards are convenient utilities in modern vehicles. With the displays getting bigger, multiple information can be displayed in one display. In addition, the number of displays increases along with the increasing number of sources providing information for passengers especially for the driver. Rotary round push button, also commonly known as jog dials, have become one intuitive control for navigating through menus and making selections of menu items. However, with multiple information and multiple level of complexity, controlling displays with conventional jog dials can be cumbersome.

SUMMARY

In an aspect, schemes are provided which solve the complexity of menu navigation and item selection by providing an efficient approach for navigating through menus or making selections of menu items for the various types of displays in vehicles and at the same time are still easy and inexpensive to use and realize.

In an aspect, a control element for navigating through at least one menu of at least one display unit and/or for selecting of at least one menu item of the menu, includes: at least one housing body having at least one first housing part and at least one second housing part, whereby the second housing part is rotatable relative to the first housing part; at least one finger element, whereby the finger element rotates relative to the first housing part when the second housing part is rotated relative to the first housing part, whereby at least one bottom surface of the finger element lies at least in areas in at least one first plane; and at least one key element having at least one button element, and at least one selection element, whereby the button element is operatively connected to the selection element, whereby actuating the button element causes the selection element to move relative to the first housing part and/or the second housing part and to approach and/or to touch the first plane.

In one embodiment, a first direction is defined by at least one axial extension of the housing body especially in a direction parallel to a vector pointing from bottom to top of the control element.

In another embodiment, the control element further includes at least one wall element directly or indirectly connected to the second housing element, wherein the wall element rotates, especially around at least one central axis of the control element, relative to the first housing part when the second housing part is rotated relative to the first housing part, the wall element has at least in areas a hollow-cylindrical shape, the wall element is arranged at least in areas within the space enclosed by the housing element, by the first housing part and/or second housing part, and/or actuating the button element causes the selection element further to move relative to the wall element.

In yet another embodiment, the control element further includes at least one fastening element for fastening the control element on the display unit, especially on at least one position of a screen area included by the display unit, whereby preferably the fastening element is rotatably mounted in the housing body, especially in the first housing part and/or in the second housing part, relative to the first housing part and/or second housing part, the fastening element includes at least in areas, especially at at least one end and/or bottom surface of the fastening element, preferably the end and/or bottom surface pointing to the first plane, at least one first electrical conductive and/or magnetic material, especially for fastening the control element, the fastening element includes, especially at at least one end and/or bottom surface of the fastening element, preferably the end and/or bottom surface pointing to the first plane, at least one first electrical conductive and/or magnetic element, especially for fastening the control element, the fastening element includes at least one suction cup and/or at least one bottom surface of the fastening element lies at least in areas in the first plane.

In one embodiment the control element further includes at least one valve element, especially for supporting cancelling of a suction force built by the suction cup, having at least one valve body and at least one valve member moveable at least in sections inside the valve body, whereby the valve member is fixedly connected to the second housing part, whereby the valve body goes through the plate element and/or the valve body is fixedly connected to the first housing part and/or the suction cup.

In the two aforementioned embodiments it is also preferred that a suction force built by the suction cup is cancelable by pulling the second housing part away from the first housing part, especially along the first direction, the valve member can be moved from at least one first position to at least one second position, especially along the first direction, to establish a fluidal connection between at least one suction body included by the suction cup and the outside of the suction cup, preferably at least one space enclosed by the housing body, more preferably enclosed by the first housing part and/or enclosed by the second housing part, and/or the valve member can be moved from the second position to the first position, especially opposite the first direction, to interrupt the fluidal connection.

In another embodiment, the control element further includes at least one plate element, especially for increasing stability of the control element, wherein the plate element is directly or indirectly connected to the second housing element and/or directly or indirectly connected to the wall element, the plate element rotates around the central axis of the control element, relative to the first housing part when the second housing part is rotated relative to the first housing part, the plate element is arranged at least in areas within the space enclosed by the first housing part, the plate element includes at least one means, especially at least one hole, for guiding the key element, especially the selection element, along and/or opposite the first direction at least in sections and/or actuating the button element causes the selection element further to move relative to the plate element.

In one embodiment the second housing part has at least in areas a dome-like shape, especially for improving stability and/or usability of the control element, the first housing part, the second housing part, the plate element, the wall element, the valve element, especially the valve member and/or the valve body, and/or the suction cup are at least essentially arranged concentrically and/or the first housing part and the second housing part are stacked on each other at least in areas, especially along the first direction and/or in at least one cross-sectional plane, the plane preferably being perpendicular to the first direction.

In yet another embodiment, the first housing part has at least in areas a hollow-cylindrical shape, especially for allowing a compact design of the control element, the first housing part includes at least in areas, especially at at least one end of the first housing part, preferably the end pointing to the first plane, at least one second electrical conductive and/or magnetic material, especially for fastening the control element, the first housing part includes, especially at at least one end and/or bottom surface of the first housing part, preferably the end and/or bottom surface pointing to the first plane, at least one second electrical conductive and/or magnetic element, especially for fastening the control element, and/or the bottom surface of the first housing part lies at least in areas in the first plane.

In another embodiment, the finger element includes at least in areas, especially at at least one end and/or at the bottom surface of the finger element, preferably the end and/or bottom surface pointing to the first plane, at least one third electrical conductive and/or magnetic material, especially for allowing the finger element to be detected, includes, especially at at least one end and/or the bottom surface of the finger element, preferably the end and/or bottom surface pointing to and/or lying in the first plane, at least one third electrical conductive and/or magnetic element, especially for allowing the finger element to be detected, is arranged at least partly inside and/or outside the space enclosed by the housing body, especially enclosed by the first housing part and/or by the second housing part, and/or is fixedly connected to the second housing part and/or the wall element.

In yet another embodiment, actuating the button element includes and/or is represented by pressing the button element, the key element, especially the selection element and/or the button element, is movable, preferably along and/or opposite the first direction and/or against the preload of at least one spring element, especially at least one coil spring, the selection element and the button element are formed in one piece, at least one first end of the key element includes the selection element and/or at least one second end, preferably opposite to the first end, includes the button element, the key element, especially the selection element and/or the button element, rotates, especially around the central axis of the control element, relative to the first housing part when the second housing part is rotated relative to the first housing part and/or the button element is moveable at least in sections through the second housing part, especially in a direction parallel and/or opposite the first direction.

In one embodiment, the key element, especially the selection element, includes at least in areas, especially at at least one end of the key element, especially the selection element, preferably the end pointing to the first plane, at least one fourth electrical conductive and/or magnetic material, especially for allowing the key element to be detected, the key element, especially the selection element, includes, especially at at least one end and/or bottom surface of the key element, especially the selection element, preferably the end and/or bottom surface pointing to the first plane, at least one fourth electrical conductive and/or magnetic element, especially for allowing the key element to be detected, the selection element extends at least in sections in the space enclosed by the first housing part, the selection element is designed at least in areas cylindrically, the selection element is, especially moveable, arranged at the second housing part, the wall element and/or the plate element and/or is movable relative to at least the first housing part, the second housing part, the wall element and/or the plate element, especially along at least the first direction.

In another embodiment, the key element, especially the selection element and/or the button element, is arranged with an offset, especially for allowing to distinguish between different key elements, preferably by 90 degree, 180 degree or 270 degree, relative to the finger element, especially along an arc of a circle and/or in at least one cross sectional plane, preferably the plane being perpendicular to the first direction.

In yet another embodiment, the control element includes a plurality of key elements, preferably two, three, four, five, six, seven, eight, nine, ten and/or more than ten key elements, whereby preferably the offset between two adjacent key elements, especially along an arc of a circle and/or in at least one cross sectional plane, preferably the plane being perpendicular to the first direction, is identical to the offset between the finger element and at least one key element, especially the first key element on the arc of the circle arranged clockwise adjacent and/or anti-clockwise adjacent to the finger element.

In another aspect, a system includes at least one display unit and at least one control element, for navigating through at least one menu of the at least one display unit and/or for selecting of at least one menu item of the menu, according to at least one embodiment of the first aspect of the invention, whereby especially the display unit is included by at least one rear view device, to which preferably the control element is attached and/or attachable.

In one embodiment, the display unit includes at least in areas at least one magnetic and/or ferromagnetic material behind and/or in the screen area included by the display unit and/or at least one evaluation tool for detecting the presence and/or the location of magnetic fields and/or electrical conduciveness of objects approaching and/or touching the screen surface of the display unit and/or of a change in capacity due to objects approaching and/or touching the screen surface of the display unit.

In another aspect, a method of using a control element includes navigating through at least one menu of at least one display unit and/or selecting of at least one menu item of the menu.

In another aspect, a method for operating a display unit, especially in conjunction with a control element and/or a system includes: detecting the presence of the control element attached at a designated area of a display unit, especially by means of detecting the presence of a first electric conductive and/or magnetic member, preferably the fastening element, more preferably the first electric conductive and/or magnetic element, and/or the first housing part, more preferably the second electric conductive and/or magnetic element, on or near the display unit; and preferably displaying on the display unit the respective menu corresponding to the display unit, especially the area thereof, the control element is attached to and/or adapting the displayed menu to where the control element is located; calculating a first selection location based at least on detecting the position of a second electric conductive and/or magnetic member, preferably the finger element, more preferably the third electric conductive and/or magnetic element, relative to the position of the first electric conductive and/or magnetic member on or near the display unit; and preferably updating the display of the display unit dependent on the first selection; calculating a second selection location based at least on detecting the position of the second electric conductive and/or magnetic member, preferably the finger element, more preferably the third electric conductive and/or magnetic element, relative to the position of the first electric conductive and/or magnetic member on or near the display unit, preferably in reaction to detecting a rotation of the control element, especially a rotation of the second electric conductive and/or magnetic member; and preferably Updating the display of the display unit dependent on the first selection; identifying a third selection location, especially which key element was actuated, based at least on detecting the position of a third electric conductive and/or magnetic member, preferably the key element, more preferably the selection element, even more preferably the fourth electric conductive and/or magnetic element, relative to the position of the second electric conductive and/or magnetic member on or near the display unit, preferably in reaction to detecting an actuated key element; and preferably updating the display of the display unit and/or triggering a predefined action.

According to aspects of the present disclosure, by providing a free placement control element, especially in form of a rotary button, the complexity of the control element for menu navigation and menu item selection can be improved. The possibility to arrange the control element at different physical positions at the display unit especially at at least one screen included by the display unit provides a source of control information and an additional level of control on its own. This in turn allows to reduce the number of different elements required for the control element to a manageable number, hence, leading to a control element which is more intuitive to use. In addition, due to omitting the need for electronic components, the complexity of the entire system is further reduced. This in turn leads to a significant cost reduction concerning the components and also allows for a cheaper manufacturing of the control element. In addition weight is reduced. Furthermore, the control element is useable independent from any power sources, which increases the comfort to use it and decreases failure of the control element.

In this respect it has been found that navigation through the selection menu is possible by means of at least one finger element which can be tracked by a respective display unit the control element is attached to in that the finger element includes at least one electrical conductive and/or magnetic material and/or at least one respective element, especially a respective third material and/or third element. This allows the display unit to evaluate a flow of electrical current, a change in capacity and/or a magnetic field in order to detect the presence and/or position of the finger element. The respective detected location of the finger element, alternatively and/or in addition may preferably further be evaluated in conjunction with its relative position to the position of a fastening element (described in greater detail below), included by the control element for fastening it to the display unit, in order to better determine the menu selection. At least one bottom surface of the finger element lies at least in areas in a first plane. This first plane for example might be the top surface of the display unit, especially the surface of the screen.

Further, making a selection of a menu item can be accomplished by actuating a key element. The key element in turn includes a selection element which includes at least one electrical conductive and/or magnetic material and/or at least one respective element, especially a respective fourth material and/or fourth element. By actuating the key element, the fourth material and/or fourth element is approaching the first plane and may even in addition and/or alternatively touch the first plane. This means that when actuating the key element at least the finger element and at least one key element (especially its respective selection element) can be detected as being present in the first plane and/or approaching the first plane. This way, also for detecting the actuation of a key element can be realized in that the display unit (or a respective controller) evaluates a flow of electrical current, a change in capacity and/or a magnetic field in order to detect the presence and/or position of the key element. Advantageously, it has been found that if the position of the detected key element is evaluated relative to the position of the detected finger element, it is possible to support more than one key element since the relative position allows to discriminate between the different keys. This only requires that the plurality of key elements are arranged in a known manner relative to each other and/or relative the finger element.

The control element advantageously includes a fastening element, mentioned above, which at the same time allows to detect the presence of the control element at the display unit and the location it is arranged at. This in turn allows to control different appearances of the display of the display unit dependent on the position the control element is attached to the display unit. Especially if the fastening element includes at least one first electrical conductive and/or magnetic material and/or element this task can be accomplished in a quite easy and effective way. Evaluation of the presence and/or the position can be accomplished preferably as described before with respect to the finger element and the key element by a flow of electrical current, a change in capacity, and/or a magnetic field being evaluated.

Preferably the fastening element alternatively and/or in addition might include at least one suction cup. This allows a comfortable attachment of the control element at the display unit. In order to further allow an easy detachment of the suction cup (i.e. the control element) from the display unit the control element may include a valve element. In that the valve member is on the one hand moveable inside the valve body (between at least first and second positions) and on the other hand is fixedly connected to the second housing part, it is possible to achieve the establishment of a fluidal connection between the inside of the suction cup and the atmosphere when the second housing part is pulled, i.e. when the control element is pulled off the display unit, so that the suction force built by the suction cup is canceled. At the same time, when the control element is attached to the display unit, i.e. when the second housing part is pushed, the fluidal connection is interrupted.

In order to realize a safety function of the key element(s), a plate element may be provided which can be designed such that it guides the key element(s), especially by means of respective holes through which the key element(s), especially the selection element(s), goes.

The control element can be advantageously used in conjunction with a display unit. The control element preferably allows the display unit to identify the position where the control element has been attached to. For example, the touch screen display of the display unit may detect the location of the control element on the screen. Dependent on the physical location to which the control element is attached to at the display unit, especially the display screen, a location-dependent menu and/or navigation may be displayed by the display unit. This allows to simplify menu structures since the location is a further parameter which can be used as a preselection.

Alternatively or in addition, it may be acknowledged:

1. Placement and location detection: Touch sensor subsystem on display detects and locates the placement of rotating button on the screen. This then triggers the dedicated menu that displayed around the button based on location on the screen.

2. Rotation detection: One conductive body rotates with the rotating body. This triggers multitouch sensor on screen to detect the rotation displacement.

3. Selection Detection: When user pushes button, this make a conductive body touches the screen. Based on relative position of the rotating body, then the multitouch subsystem detects this action.

Further, it may be acknowledged alternatively or in addition:

1. Attachment mechanism to screen that not only keep the button in place but also trigger the location detection of touch sub-system: Can be done by magnet or (micro)suction that has electrical conduction characteristics.

2. Rotating conductive that follows the movement of rotating body so that the displacement of conductive gives enough capacitive change for the touch sensor to detect the rotation movement: This then trigger the pre-selection menu on the screen based on the rotation movement.

3. A secondary moving conductive that the position relative to surface of touch screen is change between contact to non-contact according the operation of "push button": When the user pushes the button then the capacitive changes, which trigger "selection" action. This system may contain multiple buttons in one system.

4. Mechanism that triggers conductive pole movement along with button movement, and also mechanism to trigger conductive pole(s) to touch the display surface following button (s) press.

5. Identification of pressed button based on relative placement of "rotating conductive pole" and touching poles when a button is pressed.

6. Outer body material and its conductivity to internal conductive poles, that human body model can give enough capacitance discharge change of projected capacitive touch subsystem to detect conductive pole movement and conductive pole touch.

7. Rotation information is fetched by this displacement on the touch screen.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein:

FIG. 5a shows an interior of a vehicle having multiple display units

FIG. 5b shows a schematic illustrations of displays of a display unit in FIG. 5a;

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of describing the present disclosure and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the present disclosure or the appended claims. Further, it should be understood that any one of the features can be used separately or in combination with other features. Other systems, methods, features, and advantages of the present disclosure will be or become apparent to those skilled in the art upon examination of the description. It is intended that all such additional systems, methods, features, and advantages be included within this description, be within the scope of the present disclosure, and be protected by the accompanying claims.

Figure 1A:
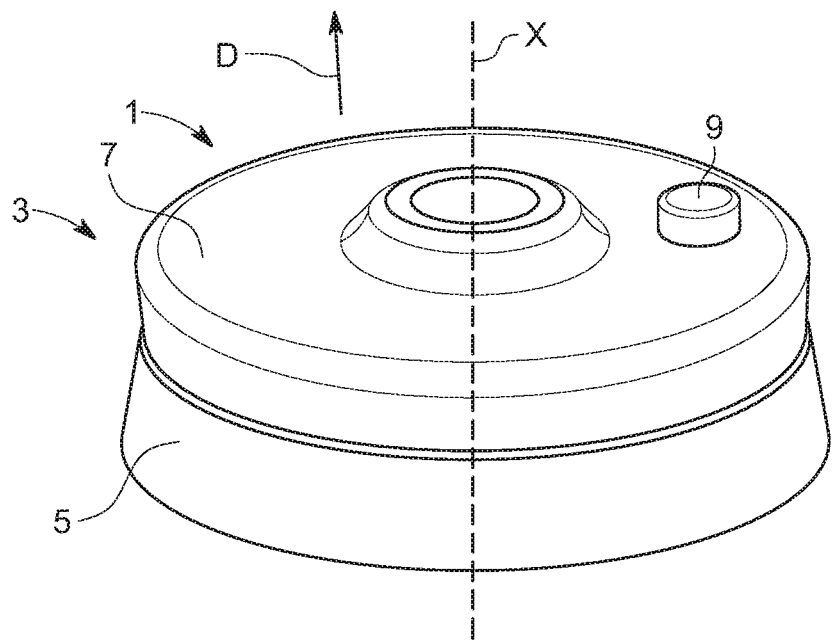
FIGS. 1a and 1b show schematic representations of a control element according to a first embodiment.

FIG. 1a shows a control element 1 in a perspective top view including a housing body 3 having a first housing part 5 and a second housing part 7. The second housing part 7 can be rotated relative to the first housing part 5. A first direction D is defined by the axial extension of the housing body 3 in a direction parallel to a vector pointing from bottom to top of the control element 1. The second housing part 7 has at least in areas a dome-like shape. The control element 1 further includes a single key element having a button element 9. The button element is movable through the second housing part 7 in a direction parallel and/or opposite the first direction D.

Figure 1B:
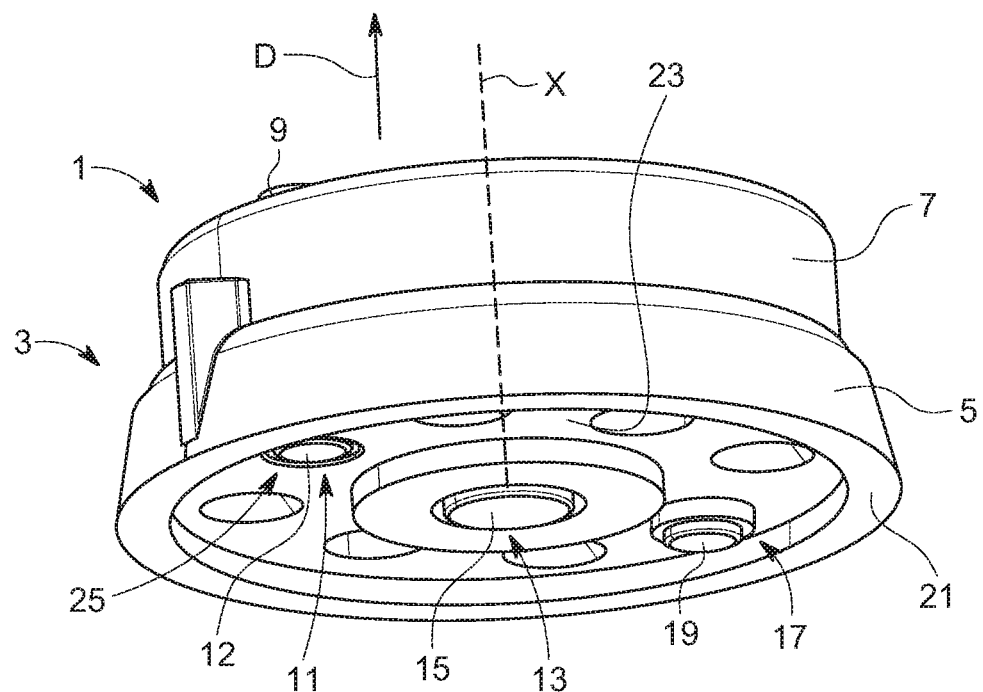

FIG. 1b shows the control element 1 in a perspective bottom view. The key element further has a selection element 11. The selection element includes at least one fourth electrical conductive and/or magnetic element 12. The control element 1 further includes a fasting element 13 for fastening the control element 1 on a display unit. The fastening element 13, therefore, includes a first electrical conductive and/or magnetic element 15. The control element 1 further includes a finger element 17. The finger element 17 includes a third electrical conductive and/or magnetic element 19. The bottom surface of the finger element 17 shown in FIG. 16 lies in a first plane (not explicitly shown in FIG. 1b).

As can be seen in FIG. 1b the first housing part 5 has at least in areas a hollow-cylindrical shape and at least one bottom surface 21 of the first housing part 5 also lies in the first plane. Further, the bottom surface of the fastening element 13 lies in the first plane. This preferably allows to arrange the control element 1 at a display unit, especially at the respective screen display, whereby the bottom surfaces of, respectively, the first housing part 5, the fastening element 13 and the finger element 17 commonly touches the screen surface.

The control element 1 further includes a plate element 23 which includes at least one hole 25 for guiding the selection element 11 along the first direction D at least in sections.

The button element 9 is operatively connected to the selection element 11, whereby actuating the button element 9 causes the selection element 11 to move relative to the first housing part 5, the second housing part 7 and the plate element 23 and to approach and/or touch the first plane. Actually the selection element 11 is movable along and/or opposite the first direction D. By approaching and/or touching the first plane a further electrical conductive and/or magnetic material/element (i.e. the fourth material and/or element) can be detected in and/or near the first plane.

Thus, control element 1 uses one key element for selection and a second housing part 7 that extends to half of the housing body 3.

The finger element 17, the key element, especially the button element 9 and the selection element 11, and the plate element 23 rotate, especially all together and/or around the central axis X of the control element, relative to the first housing part 5 when the second housing part 7 is rotated relative to the first housing part 5.

As the finger element 17 rotates along with the second housing part 7 a selection of menu can be calculated based on the position of the finger element 17, especially the third electrical conductive and/or magnetic element 19, relative to the fastening element 13.

When the button element 9 is actuated, especially pressed, the selection element 12 moves lower so that it makes a contact with this screen of the display unit, especially a touch panel surface. The subsystem of the display unit then triggers a "selection" action based on this pressed button element 9, as will be described later in greater detail.

The first housing part 5 may be made of magnetic material for attachment mechanism but also can be made of electrical conductive material or even electric nonconductive material.

The material chosen for the fastening element 13 may be an electrical conductive material and/or magnetic material. The touch panel subsystem then detects this material characteristics (electrical conductive/magnetic) as the fastening element 13 is placed on the screen. At the same time the fastening element 13 behaves as attachment mechanism. Therefore, the material may be a magnetic one.

Of course, another design may have a second housing part that is separated from the key element, which makes the key element stays on its place during rotation of the second housing part relative to the first housing part.

Figure 2A:
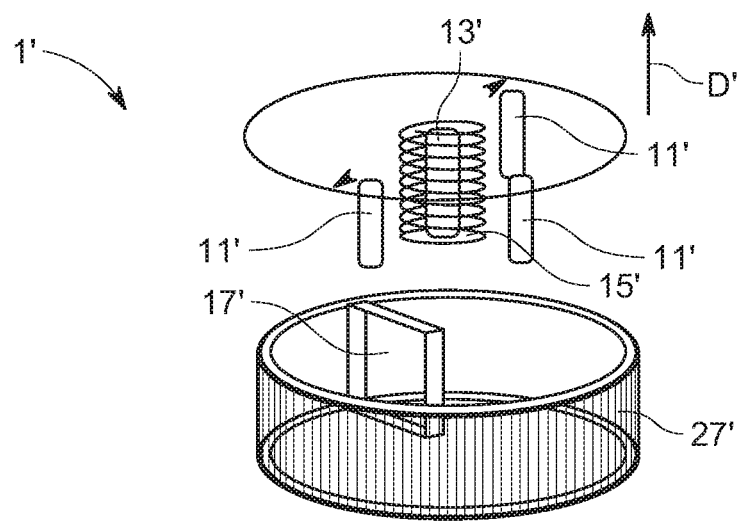
FIGS. 2a, 2b, and 2c show schematic representations of the inside of a control element according to a second embodiment.
Figure 2B:
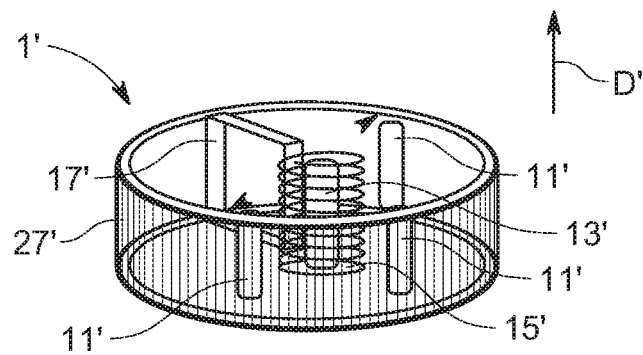
Figure 2C:
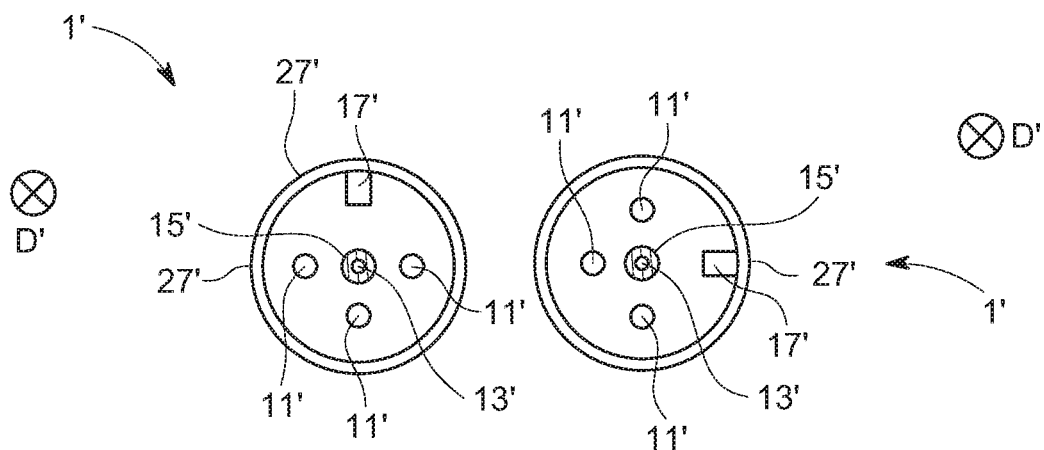

FIGS. 2a-2c show as schematic representation of the inside of a control element 1' according to a second embodiment of the first aspect of the invention in a partly explosion representation. Elements which functionally correspond as far as possible to those of control element 1 shown in FIG. 1a and FIG. 1b are provided with the same reference signs, however, single dashed.

In FIG. 2a a finger element 17' is arranged at a wall element 27' which is directly connected to a second housing part (not shown in FIG. 2a), whereby the wall element 27', hence the finger element 17', rotates relative to a first housing part (not shown in FIG. 2a) when the second housing part is rotated relative to the first housing part. The wall element 27' is arranged within the space enclosed by the first housing part. Further the control element 1' includes three key elements, of which the respective three selection elements 11' are shown in FIG. 2a. The control element 1' further includes a fastening element 13' which in turn includes a first electrical conductive and/or magnetic element 15'.

FIG. 2b shows the elements of FIG. 2a in their final position.

FIG. 2c shows two bottom views of the arrangement shown in FIG. 2b. The bottom view on the left-hand side of FIG. 2c shows the control element 1' with the finger element 17' being at the 12 o'clock position and the three selection elements 11' being at the, respectively, 3 o'clock position, 6 o'clock position and 9 o'clock position. The bottom view on the right-hand side of FIG. 2c shows the control element 1' with the finger element 17' being at the 3 o'clock position and the three selection elements 11' being at the, respectively, 6 o'clock position, 9 o'clock position at the 12 o'clock position. From this representation it can be especially taken that the offset between two adjacent selection elements 11' along an arc of a circle in at least one cross-sectional plane perpendicular to the first direction D' is identical to the offset between the finger element 17' and the first selection element 11 on the arc of the circle arranged clockwise adjacent to the finger element 17'. In other words the finger element 17' and the selection elements 11' are arranged with an offset of 90° in a clockwise direction.

From FIGS. 2a-2c, it is evident that the control element 1' includes only passive components, hence, it has low manufacturing and component costs, has zero risk of power outage during operation and has low weight.

In total, the control element 1' includes at least four at least in areas electrical conductive and/or magnetic elements: One for rotation detection (i.e. the finger element) and three for selection detection (i.e. the selection elements). The selection elements 11' rotate with the second housing part and touches the display surface when the buttons are actuated. The finger element 17' rotates with the second housing part and is always in contact with the display surface.

Figure 3A:
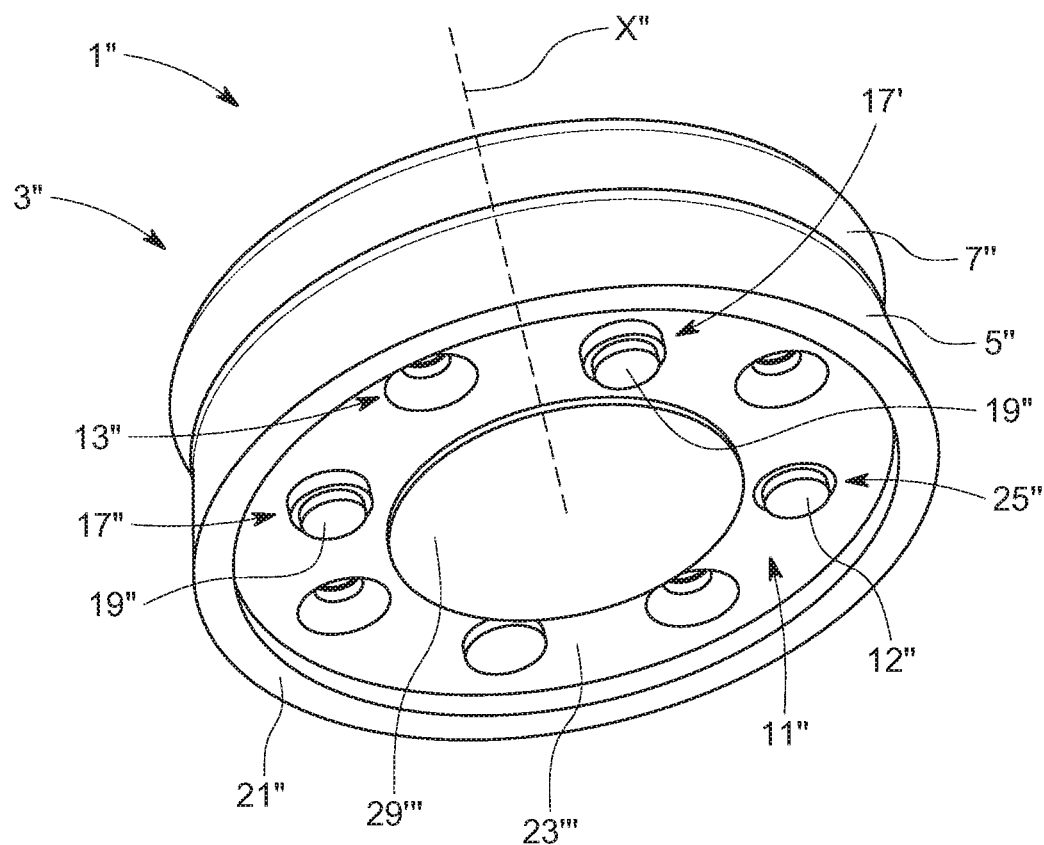
FIGS. 3a and 3b show schematic representations of a control element according to a third embodiment.
Figure 3B:
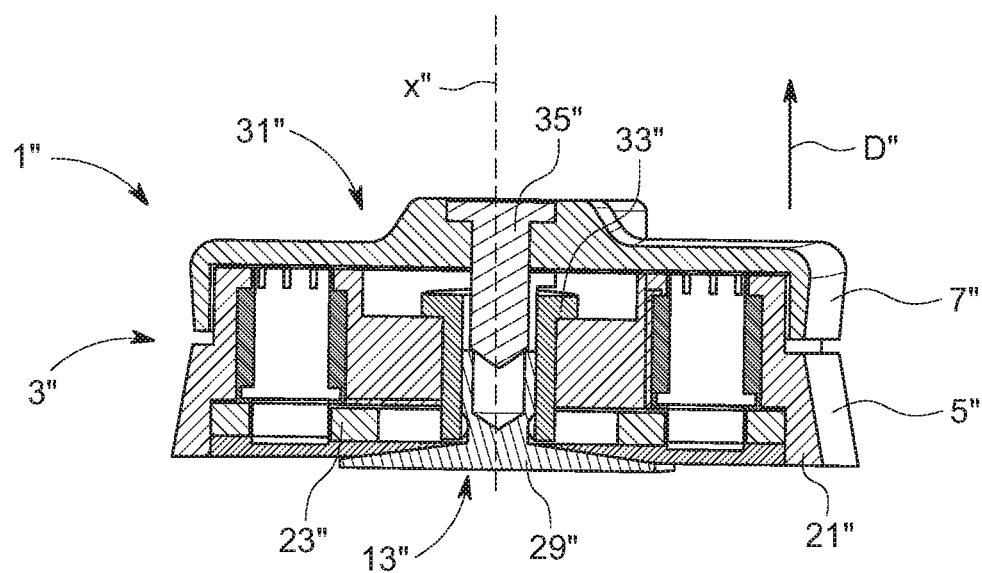

FIGS. 3a-3b show as schematic representation of a control element 1" according to a third embodiment of the first aspect of the invention. Elements which functionally correspond as far as possible to those of control element 1 shown in FIG. 1a and FIG. 1b or to the control element 1' shown in FIGS. 2a-2c are provided with the same reference signs, however, doubled dashed.

In FIG. 3a, a perspective bottom view of the control element 1" is shown. The fastening element 13" included by control element 1" includes a suction cup 29" in form of a suction body. The suction cup 29" may preferably use conductive material for on-screen placement detection. Preferably the control element 1" instead may include two finger elements 17", hence also two third electrical conductive and/or magnetic elements 19" are present which always have contact with a screen of the display unit where the control element 1" is attached to.

In FIG. 3b, a perspective and partly cross-sectional side view of the control element 1" is shown. The control element 1" further includes a valve element 31" having a valve body 33" and a valve member 35" moveable at least in sections inside the valve body 33". The valve member 35" is fixedly connected to the second housing part 7". The valve body 33" goes through the plate element 23" and is fixedly connected to the suction cup 29". When the upper part of the housing body 3", i.e. the second housing part 7", is pulled, the valve element 31" is released and air can flow into the suction cup 29". In other words the valve body 33" moves along with the second housing part 7" in a direction along the first direction D" when pulled, and let air flows into the suction cup 29". As consequence, the pull action then will cancel the suction force and release the control element 1" from the display unit the control element 1" is arranged at.

Figure 4A:
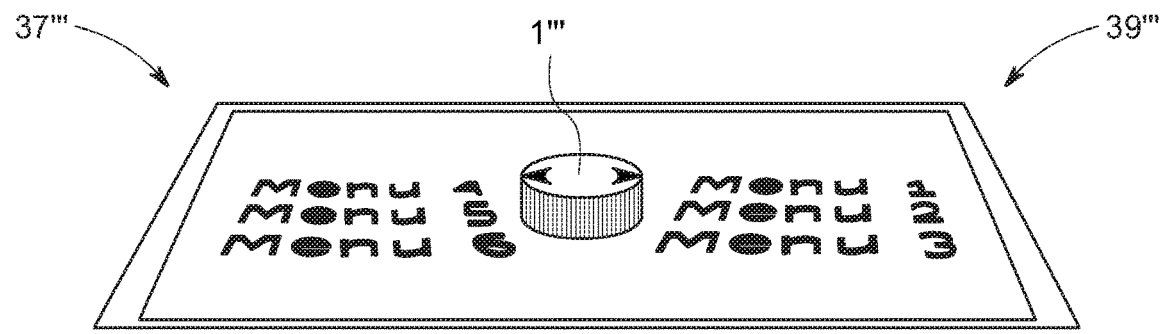
FIGS. 4a, 4b, and 4c show schematic representations of systems.
Figure 4B:
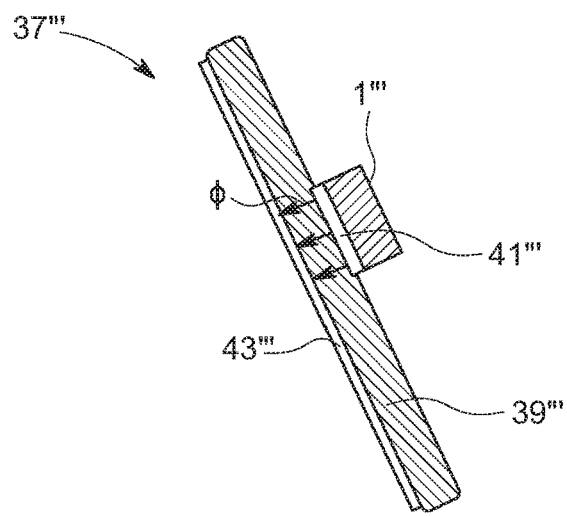
Figure 4C:
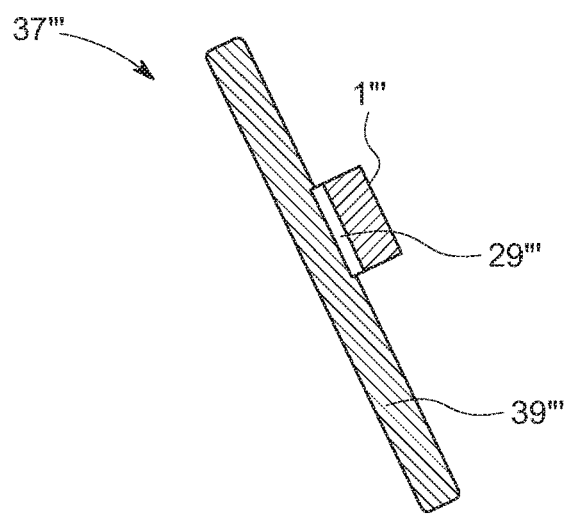

FIG. 4a-4c show schematic representations of a system 37''' including a control element 1''' according to the first aspect of the invention and a display unit 39''' to which the control element 1''' is attached and/or attachable. Elements which functionally correspond as far as possible to those of control element 1 shown in FIG. 1a and FIG. 1b, to the control element 1' shown in FIGS. 2a-2c, or to the control element 1" shown in FIG. 3a-3b are provided with the same reference signs, however, tripled dashed.

FIG. 4a shows the system 37''' in a perspective view.

FIG. 4b shows the system 37''' with a first fastening mechanism. The first housing part of the control element 1''' includes a second electrical conductive and/or magnetic element 41''' which is arranged at the bottom surface of the first housing part. The second electrical conductive and/or magnetic element 41''' may be provided alternatively and/or in addition to a fastening element. Especially the second electrical conductive and/or magnetic element 41''' may be used to reinforce the attachment force. For this configuration the display unit 39''' includes at least in areas a magnetic and/or ferromagnetic material 43'''' behind and/or in at least one screen area. This is a quite simple design of the control element 1''' and does not require cleaning of the display unit 39'''.

FIG. 4c shows the system 37''' with a second fastening mechanism. The control element 1''' is attached to the display unit 39''' by means of a suction cup 29'''. Thus, no need for additional electrical and/or magnetic structures on the display are required which leads to lower cost.

Figures 5A, 5B:
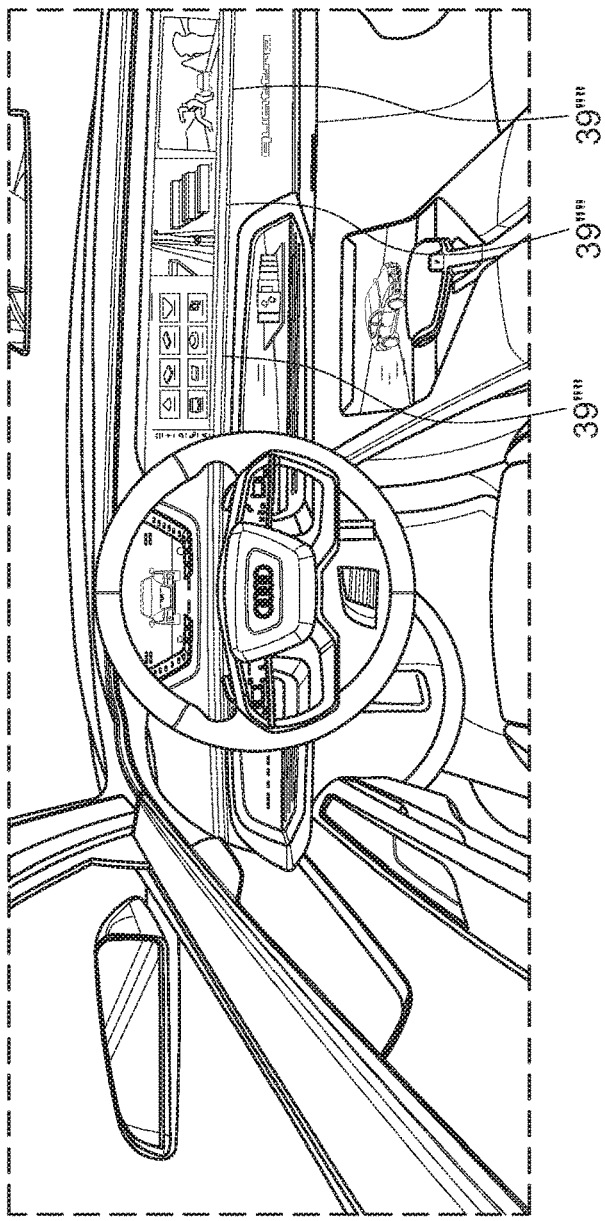

FIG. 5a shows an interior of a vehicle having multiple display units 39''''. FIG. 5b shows schematic illustrations of displays of the respective display units 39'''' dependent on which of the three display units 39'''' a control element according to the first aspect of the invention is attached to. As can be taken from FIG. 5b, if the control element is arranged on the left-side display unit 39'''' a basic car control navigation menu is shown on the respective display unit 39''''. If the control element is arranged on the middle display unit 39'''' a navigation control navigation menu is shown on the respective display unit 39''''. If the control element is arranged on the right-side display unit 39'''' a multimedia control navigation menu is shown on the respective display unit 39''''.

Figure 6A:
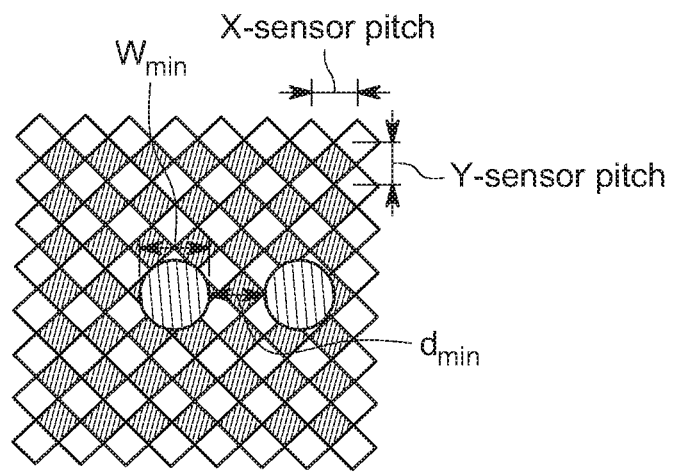
FIG. 6a shows a schematic illustration of a screen of a display unit.

FIG. 6a shows a schematic illustration of a screen in form of a touch sensor pattern of the display unit to which the control element according to the first aspect of the invention can be attached to with annotations regarding principal values. The figure is with respect to considerations of projective capacitive touch sensor design to each conductive body distance. Wmin and Dmin depending on the attached performance specifications, which are influenced by the conductive material, the sensor pattern, the cover material thickness and the touch controller IC performance. For example Wmin and Dmin may be 1.5 times of the sensor pitch. This in turn means that for sensor pattern which has for example 5 mm pitch, both, Wmin and Dmin usually needs to be bigger than 7.5 mm.

Figure 6B:
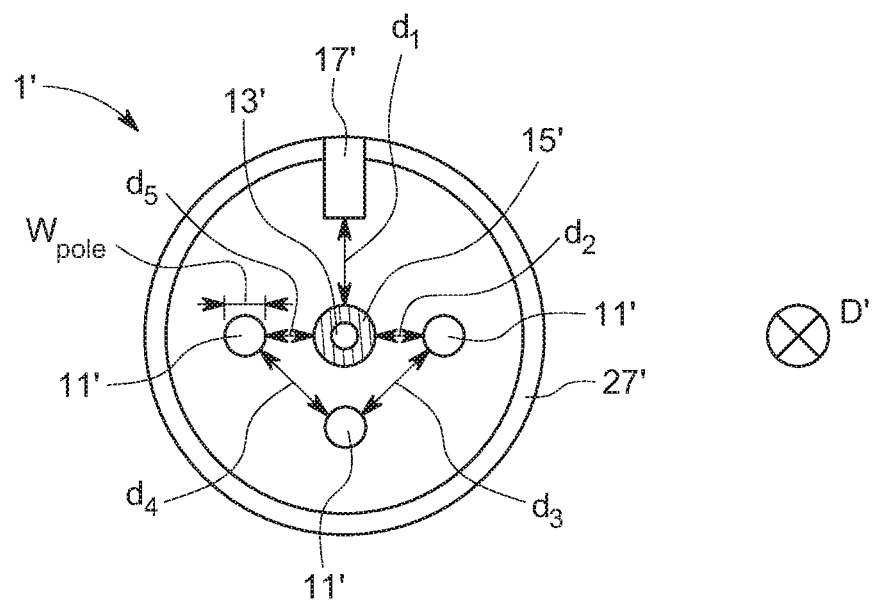
FIG. 6b shows a schematic illustration of a bottom view on a control element.

FIG. 6b shows a schematic illustration of a bottom view of a control element according to the first aspect of the invention, such as the one from the left-hand side of FIG. 2c, especially the control element 1', with annotations regarding principal values in conjunction with FIG. 6a. If dmin is the minimum finger separation distance then d1, d2, d3, d4, d5>=dmin. If Wmin is the minimum metal slug diameter for touch subsystem to detect then Wpole>=Wmin.

Figure 6C:
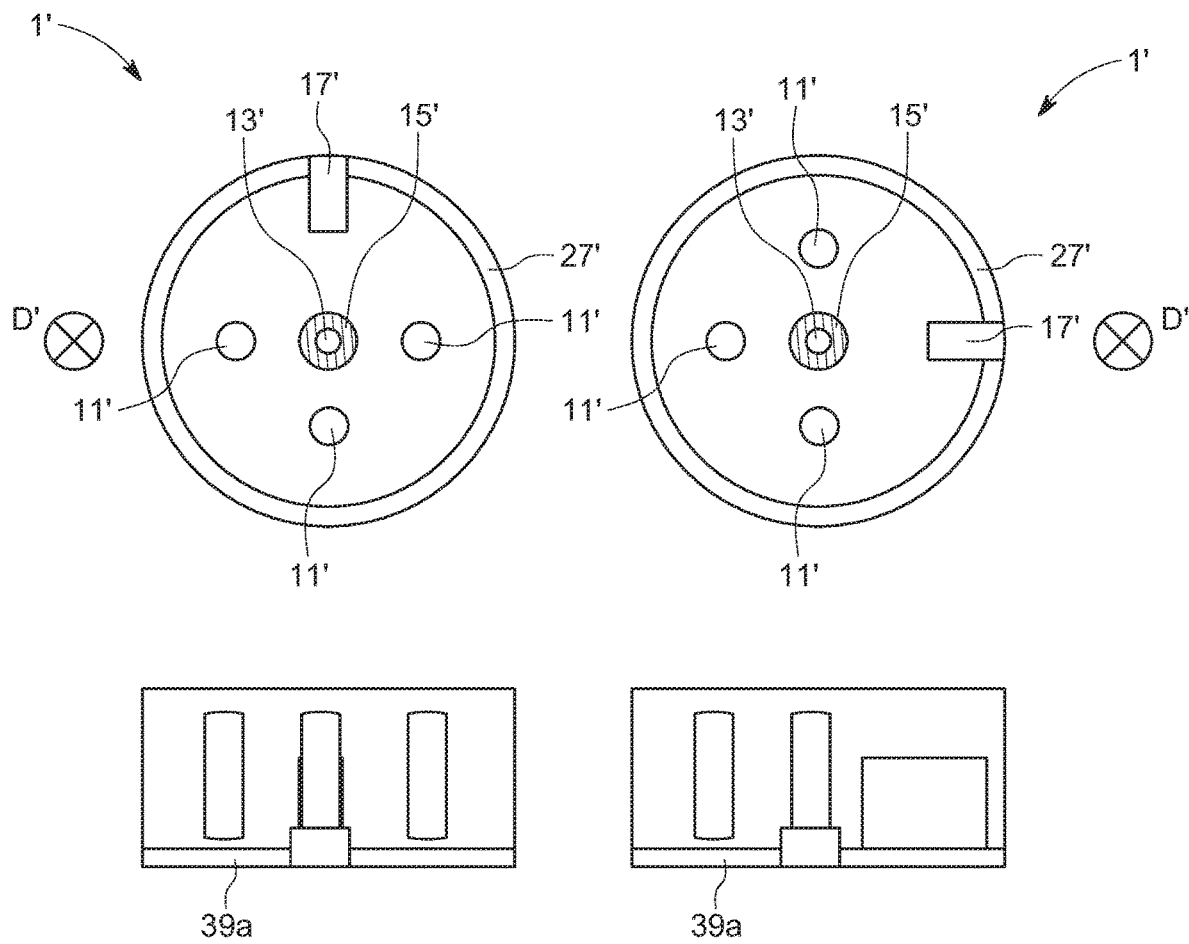
FIG. 6c shows schematic illustrations of a system with actuated key elements.

FIG. 6c shows in the top row schematic illustrations of bottom views of a control element according to the first aspect of the invention, especially the control element 1', in two different rotation configurations as already known from FIG. 2c. In the bottom row FIG. 6c shows schematic illustrations of the side views of the respective control elements with different key elements actuated. In the left column (finger element 17' at 12 o'clock position) the key element at 6 o'clock is actuated, i.e. the respective button element is pressed and the respective selection element touches the screen of a display unit 39a. In the right column (finger element 17' at 3 o'clock position) the key element at 6 o'clock (which in the left column was the key element at the 3 o'clock position) is actuated, i.e. the respective button element and the respective selection element is pressed.

Figure 7A:
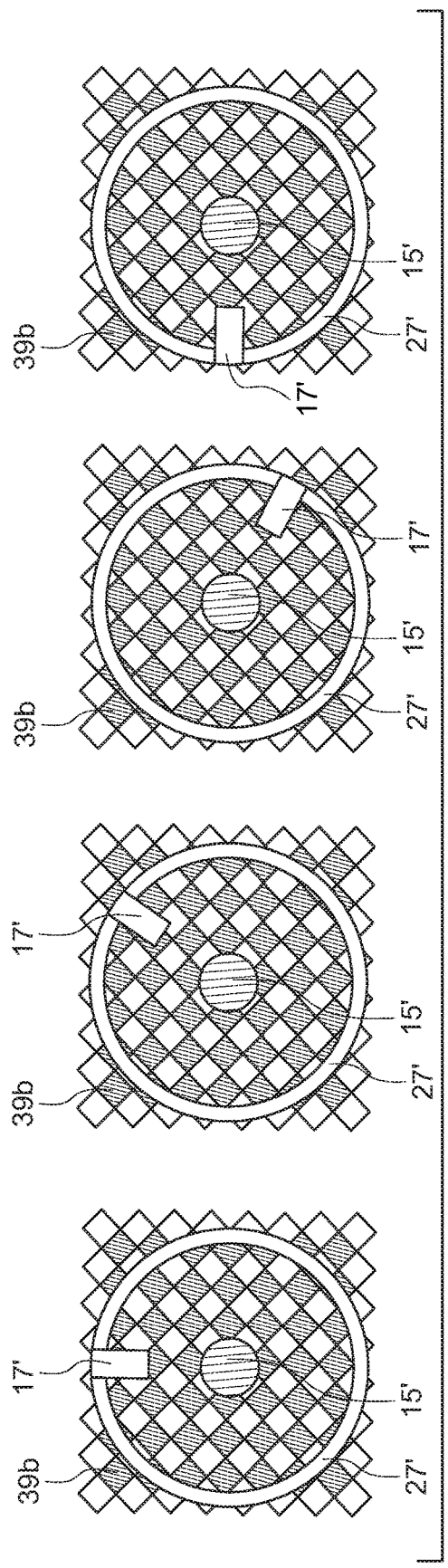
FIG. 7a shows schematic illustrations of different menu selections.

FIG. 7a shows a schematic illustration of different menu selections, i.e. different rotation positions of a finger element, for example finger element 17', on a display unit 39b. Or in other words FIG. 7a illustrates rotation detection of a control element placed on the screen of the display unit 39b. The touch sensor may preferably detect that the control element is placed by detecting its "preregistered shape". For example, it is outer round body (first housing part), inner round pillar (fastening element) and rotating pillar (finger element). FIG. 7a shows how the touch sensor identifies the rotation: 12 O'clock selection, 1 O'clock, 4 O'clock, 9 O'clock selection respectively, especially by comparing the relative position of the finger element, especially finger element 17', and the fastening element, especially fastening element 15'. The "on screen menus" can be placed accordingly, considering the "minimum displacement/movement" of touch sensor characteristics.

Figure 7B:
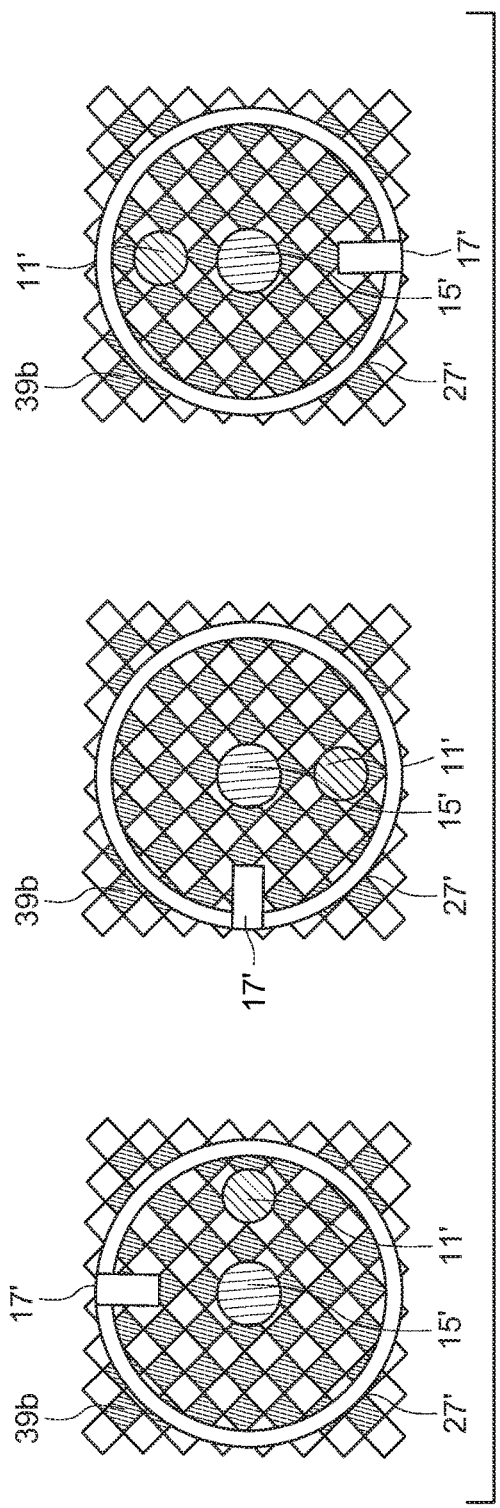
FIG. 7b shows schematic illustrations of different menu item selections.

FIG. 7b shows a schematic illustration of different key elements actuated, for example by means of the different selection elements 11'. Actuating a key element (i.e. pressing the button element) is detected by the touch subsystem of the display unit 39b, e.g. by identifying "additional touching object(s)" within the preset area of "Rotating button", and its relative position to "rotating pillar" (finger element) that always touches the surface of touch screen. In the left view of FIG. 7b the key element with offset of 90° with respect to the finger element is pressed. In the middle view of FIG.

7b the key element with offset of 270° with respect to the finger element is pressed. In the right view of FIG. 7b the key element with offset of 180° with respect to the finger element is pressed.

It is acknowledged that the pattern of the display unit 39a and 39b may be understood as that touch sensor pattern X and Y.

Figure 8:
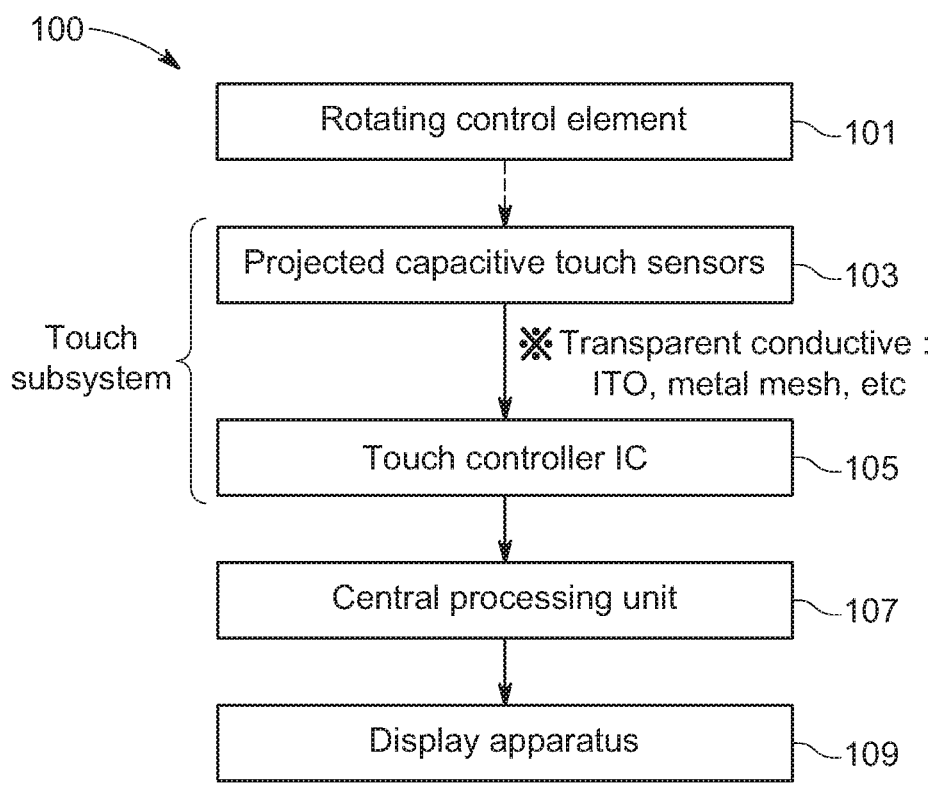
FIG. 8 shows a flow chart.
Figure 9:
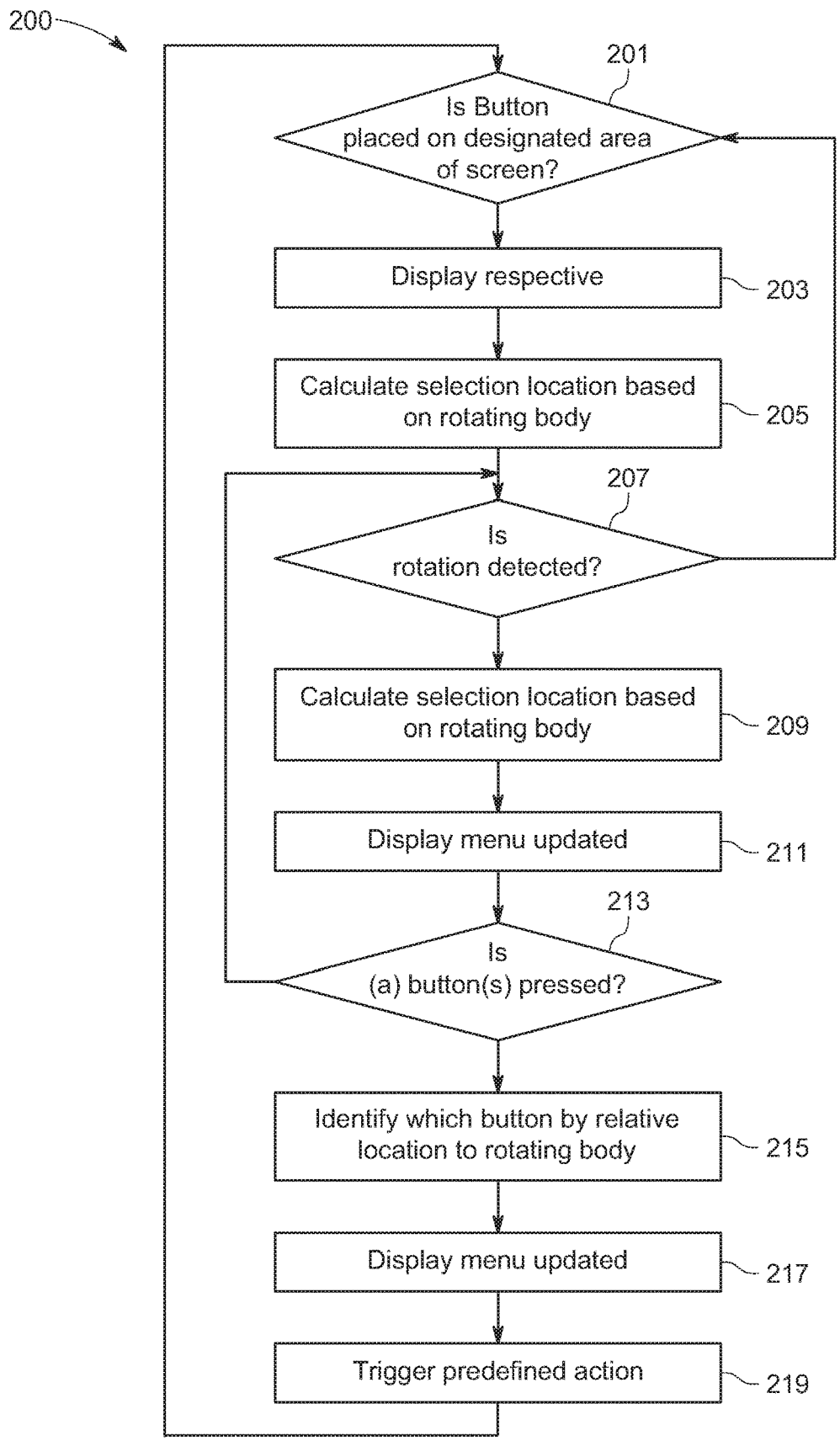
FIG. 9 shows a flow chart of a method.

FIG. 8 shows a flowchart 100 regarding a system block diagram for illustration of how a control element according to the first aspect of the invention works in conjunction with a display unit, especially changing the content of the display dependent on control element actions. In a step 101 a control element is rotated, i.e. a second housing part is rotated relative to a first housing part. In a step 103 projected capacitive touch sensors are provided which changes the capacitive when conductive touches the surface of the touch screen. In a step 105 touch control IC is provided which calculates based on capacitive change of the touch sensor at least one size of the conductive body, at least one location and at least one a displacement of them. In a central processing unit the information from the touch controller IC on touch information is received in a step 107 and based on this content in a step 109 change of a display unit is performed and/or a predefined action is executed.

FIG. 8 shows a flowchart 200 of a method according to the fourth aspect of the invention.

In a step 201 the presence of a control element is detected at the designated area of a display unit. When the control element is placed on the display unit, the touch screen sensor identifies the control element by its bottom electric conductive and/or magnetic characteristics (like size of the circular), to prevent mis-detection of "finger touch".

In a step 203, as the placement is detected, the menu surrounding the control element is displayed based on location of the button (e.g. if it placed on navigation area it will display the navigation menu, etc.).

In a step 205 the location of selection is then calculated by relative calculating the placement of the rotating conductive (i.e. finger element) to the central conductive (i.e. fastening element).

In steps 207 through 211 as a rotation of the control element, especially a rotation of the second housing part relative to the first housing part, is detected by the touch sensor, the menu of current pre-selection is updated.

In steps 213 through 215 when actuated key element is detected (e.g. as third touch in addition of central and rotating conductive) the system then calculates the relative position of this contact to determine which button is pressed.

In a step 217 the menu based on this detection is updated.

In a step 219 a pre-defined action is triggered.

Preferably the steps of methods disclosed in this application are proceeded in the order as mentioned. However, alternatively every other sequence of the single steps may be possible.

The features disclosed in the claims, the specification, and the drawings maybe essential for different embodiments of the claimed invention, both separately or in any combination with each other.

REFERENCE SIGNS 1, 1', 1", 1'" Control element
3, 3" Housing body
5, 5" Housing part
7, 7" Housing part
9 Button element
11, 11', 11" Selection element
12, 12" Element
13, 13', 13" Fastening element
15, 15' Element
17, 17', 17" Finger element
19, 19" Element
21, 21" Surface
23, 23" Plate element
25, 25', 25" Hole
27' Wall element
29", 29'" Suction cup
31" Valve element
33" Valve body
35" Valve member
37" cc System
39'", 39"" Display unit
39a, 39b Display unit
41'" Element
43'" Material
100 Flow chart
101-109 Step
200 Flow chart
201-219 Step
D, D', D" Direction
X, X" Axis

What is claimed is:

1. A control element for navigating through a menu of a display unit or selecting a menu item of the menu, comprising:
   at least one housing body, comprising
      at least one first housing part; and
      at least one second housing part which is rotatable relative to the first housing part;
   at least one finger element which rotates relative to the first housing part in response to the second housing part rotating relative to the first housing part whereby at least one bottom surface of the finger element lies, at least in areas, in at least one first plane;
   at least one key element, comprising
      at least one button element; and
      at least one selection element, the button element being operatively connected to the selection element whereby actuating the button element causes the selection element to move relative to at least one of the first housing part or the second housing part and to approach and touch the first plane; and
   at least one valve element for supporting cancelling of a suction force built by a suction cup, a valve body comprising
      at least one valve body; and
      at least one valve member moveable at least in sections inside the valve body whereby the valve member is fixedly connected to the second housing part,
   wherein at least one of the valve body goes through a the plate element and the valve body is fixedly connected to the first housing part or the suction cup.

2. The control element of claim 1, wherein a first direction is defined by at least one axial extension of the housing body.

3. The control element of claim 2, wherein the axial extension of the housing body is in a direction parallel to a vector pointing from bottom to top of the control element.

4. The control element of claim 1, further comprising at least one wall element directly or indirectly connected to the at least one second housing part.

5. The control element of claim 4, wherein at least one of
- the wall element rotates around at least one central axis of the control element relative to the first housing part when the second housing part is rotated relative to the first housing part,
- the wall element has, at least in areas, a hollow-cylindrical shape,
- the wall element is arranged, at least in areas, within the space enclosed by at least one of the first housing part or the second housing part, and
- actuating the button element causes the selection element further to move relative to the wall element.

6. The control element of claim 1, further comprising at least one fastening element for fastening the control element on the display unit.

7. The control element of claim 6, wherein the at least one fastening element is provided for fastening the control element on at least one position of a screen area part of the display unit, and wherein at least one of
- the fastening element is rotatably mounted in the housing body with the mounting being at least one of in the first housing part or in the second housing part, and with the rotation being relative to at least one of the first housing part or the second housing part,
- the fastening element comprises at least at one of one end and bottom surface of the fastening element, pointing to the first plane, at least one of a first electrical conductive or magnetic material for fastening the control element,
- the fastening element comprises at least one of the end and bottom surface pointing to the first plane, at least one of a first electrical conductive and magnetic element for fastening the control element,
- the fastening element comprises at least one suction cup, and
- at least one bottom surface of the fastening element lies, at least in areas, in the first plane.

8. The control element of claim 1, wherein at least one of
- a suction force built by the suction cup is cancelable by pulling the second housing part away from the first housing part along a first direction,
- a valve member can be moved from at least one first position to at least one second position, along the first direction, to establish a fluidal connection between at least one suction body comprised by the suction cup and the outside of the suction cup, or at least one space enclosed by the housing body, the first housing part, or the second housing part, and
- the valve member can be moved from the second position to the first position, opposite the first direction, to interrupt the fluidal connection.

9. The control element of claim 1, further comprising at least one plate element for increasing stability of the control element.

10. The control element of claim 9, wherein at least one of
- the at least one plate element is directly or indirectly connected to at least one of the second housing element and a wall element,
- the at least one plate element rotates around the central axis of the control element relative to the first housing part when the second housing part is rotated relative to the first housing part,
- the at least one plate element is arranged, at least in areas, within the space enclosed by the first housing part,
- the at least one plate element comprises at least one means or at least one hole for guiding the key element or the selection element along or opposite a first direction, at least in sections, or
- actuating the button element causes the selection element further to move relative to the plate element.

11. The control element of claim 1, wherein at least one of
- the first housing part has at least in areas a hollow-cylindrical shape for allowing a compact design of the control element,
- the first housing part, at least in areas, or at least one end of the first housing part, or at the end pointing to the first plane comprises at least one of a second electrical conductive and magnetic material for fastening the control element,
- the first housing part comprises, at at least one of an end and bottom surface of the first housing part or at at least one of the end and bottom surface pointing to the first plane, at least one of a second electrical conductive and magnetic element for fastening the control element, and
- the bottom surface of the first housing part lies, at least in areas, in the first plane.

12. The control element of claim 1, wherein at least one of
- the second housing part comprises, at least in areas, a dome-like shape for improving stability or usability of the control element,
- at least one of the first housing part, the second housing part, a plate element, a wall element, a valve element, a valve member, a valve body, or a suction cup are at least essentially arranged concentrically, or
- the first housing part and the second housing part are stacked on each other, at least in areas, along a first direction or in at least one cross-sectional plane which is perpendicular to the first direction.

13. The control element of claim 1, wherein at least one of
- the finger element comprises, at least in areas, at least one of an end and at the bottom surface of the finger element, or at the end or bottom surface pointing to the first plane, at least one of a third electrical conductive or magnetic material for allowing the finger element to be detected,
- the finger element comprises, at at least one of an end and the bottom surface of the finger element or at the end or bottom surface pointing to or lying in the first plane, at least one of a third electrical conductive or magnetic element for allowing the finger element to be detected,
- the finger element is arranged, at least partly, at least one of inside or outside the space enclosed by the housing body or enclosed by at least one of the first housing part or the second housing part, and
- the finger element is fixedly connected to at least one of the second housing part or a wall element.

14. The control element of claim 1, wherein at least one of
- actuating the button element comprises and is represented by pressing the button element,
- the key element, or at least one of the selection element and the button element, is movable at least one of along or opposite a first direction and against the preload of at least one spring element or at least one coil spring,
- the selection element and the button element are formed in one piece, at least one of the first end of the key element comprises the selection element and at least one second end, opposite to the first end, comprises the button element, the key element, or at least one of the selection element and the button element, rotates around the central axis of the control element relative to the first housing part in response to the second housing part being rotated relative to the first housing part, and the button element is moveable at least in sections through the second housing part in a direction parallel or opposite the first direction.

15. The control element of claim 1, wherein at least one of the key element or the selection element comprises, at least in areas, at at least one end of the key element or the selection element, or at the end pointing to the first plane, at least one of a fourth electrical conductive or magnetic material for allowing the key element to be detected, the key element or the selection element comprises, at at least one of an end and bottom surface of the key element or the selection element or at the end or bottom surface pointing to the first plane, at least one of a fourth electrical conductive or magnetic element for allowing the key element to be detected, the selection element extends at least in sections in the space enclosed by the first housing part, the selection element is designed, at least in areas, cylindrically, the selection element is moveable and arranged at at least one of the second housing part, a wall element, or a plate element, or is movable relative to at least one of the first housing part, the second housing part, the wall element, or the plate element along a first direction.

16. A control element for navigating through a menu of a display unit or selecting a menu item of the menu, comprising:

at least one housing body, comprising at least one first housing part; and at least one second housing part which is rotatable relative to the first housing part;

at least one finger element which rotates relative to the first housing part in response to the second housing part rotating relative to the first housing part whereby at least one bottom surface of the finger element lies, at least in areas, in at least one first plane;

at least one key element, comprising at least one button element; and at least one selection element, the button element being operatively connected to the selection element whereby actuating the button element causes the selection element to move relative to at least one of the first housing part or the second housing part and to approach and touch the first plane;

wherein the key element or at least one of the selection element and the button element is arranged with an offset for allowing to distinguish between different key elements by 90 degree, 180 degree or 270 degree relative to the finger element at least one of along an arc of a circle or in at least one cross sectional plane or a plane being perpendicular to a first direction.

17. A control element for navigating through a menu of a display unit or selecting a menu item of the menu, comprising:

at least one housing body, comprising at least one first housing part; and at least one second housing part which is rotatable relative to the first housing part;

at least one finger element which rotates relative to the first housing part in response to the second housing part rotating relative to the first housing part whereby at least one bottom surface of the finger element lies, at least in areas, in at least one first plane;

a plurality of key elements, or two, three, four, five, six, seven, eight, nine, ten or more than ten key elements, at least one of the plurality of key elements comprising at least one button element; and at least one selection element, the button element being operatively connected to the selection element whereby actuating the button element causes the selection element to move relative to at least one of the first housing part or the second housing part and to approach and touch the first plane.

18. The control element of claim 17, wherein the offset between two adjacent key elements, at least one of along an arc of a circle and in at least one cross sectional plane or a plane being perpendicular to a first direction, is identical to the offset between the finger element and at least one key element or a first key element on the arc of the circle arranged clockwise adjacent or anti-clockwise adjacent to the finger element.

19. A system comprising at least one display unit and at least one control element for navigating through at least one menu of the at least one display unit and for selecting of at least one menu item of the menu of claim 1.

20. The system of claim 19, wherein the display unit is part of at least one rear view device to which the control element is attached or attachable.

21. The system of claim 19, wherein the display unit comprises at least one of at least in areas, at least one of a magnetic or ferromagnetic material behind or in the screen area which is part of the display unit, or at least one evaluation tool for detecting at least one of a presence and location of magnetic fields or electrical conductivity of objects approaching and touching the screen surface of the display unit or of a change in capacity due to objects approaching and touching the screen surface of the display unit.

22. A method of using the control element of claim 1, comprising:

navigating through at least one menu of at least one display unit; and selecting at least one menu item of the menu.

23. A method for operating the display unit in conjunction with the control element of the system of claim 19, the method comprising:

detecting the presence of the control element attached at at least one of a designated area of a display unit and the first housing part and at least one of displaying on the display unit the respective menu corresponding to the display unit the control element is attached to or adapting the displayed menu to where the control element is located;

calculating a first selection location based at least on detecting the position of at least one of a second electric conductive or magnetic member, the finger element, or at least one of a third electric conductive or magnetic element relative to the position of at least one of a first electric conductive and magnetic member on or near the display unit, and updating the display of the display unit dependent on the first selection;

calculating a second selection location based at least on detecting the position of the at least one of the second electric conductive and magnetic member, the finger element, or at least one of the third electric conductive or magnetic element relative to the position of at least one of the first electric conductive and magnetic member on or near the display unit in reaction to detecting a rotation of the control element or a rotation of at least one of the second electric conductive or magnetic member, and updating the display of the display unit dependent on the first selection; and identifying a third selection location or which key element was actuated, based at least on detecting a position of at least one of a third electric conductive or magnetic member, the key element, the selection element, or at least one of a fourth electric conductive or magnetic element, relative to the position of at least one of the second electric conductive or magnetic member on or near the display unit in reaction to detecting an actuated key element, and updating the display of the display unit or triggering a predefined action.

24. The method of claim 23, wherein at least one of detecting the presence of the control element attached at the designated area of the display unit or the first housing part is by detecting a presence of at least one of a first electric conductive or magnetic member, a fastening element, or at least one of the first electric conductive or magnetic element, and the control element is attached at the designated area of at least one of the second electric conductive or magnetic element, on or near the display unit.

* * * * *